Jan. 24, 1967 — W. L. LULI ET AL — 3,300,231
VEHICLE FRAME
Filed Aug. 27, 1964 — 2 Sheets-Sheet 1

INVENTORS
Walter L. Luli
Warren J. Young
BY *Watts & Fisher,* attys.

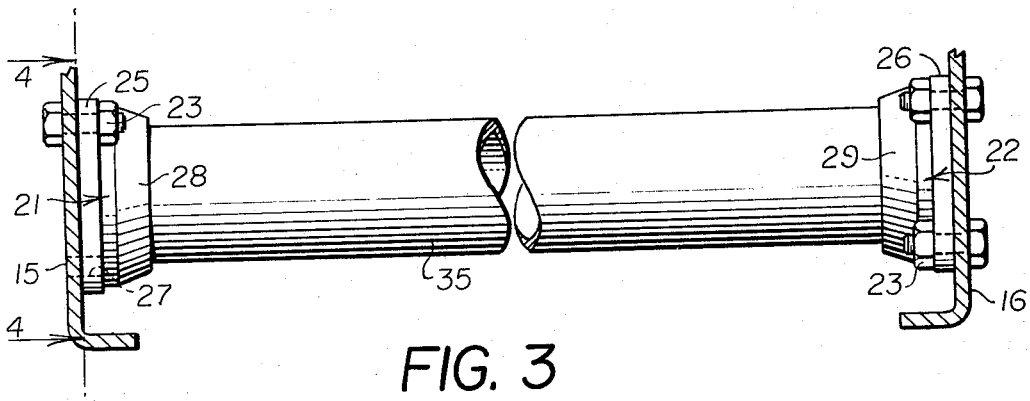
FIG. 3
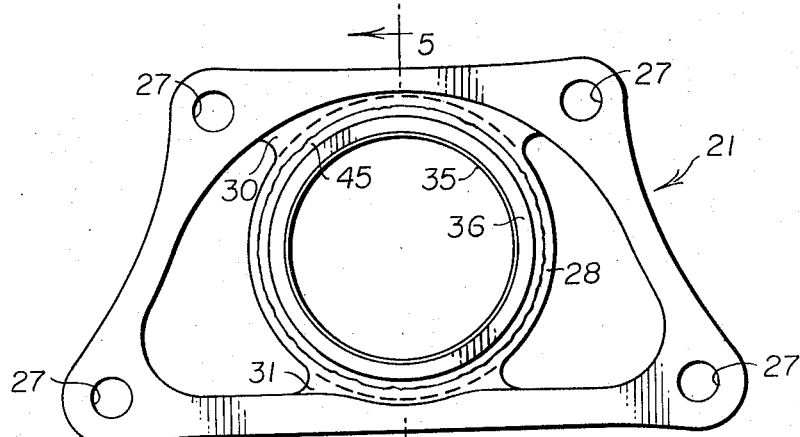
FIG. 4
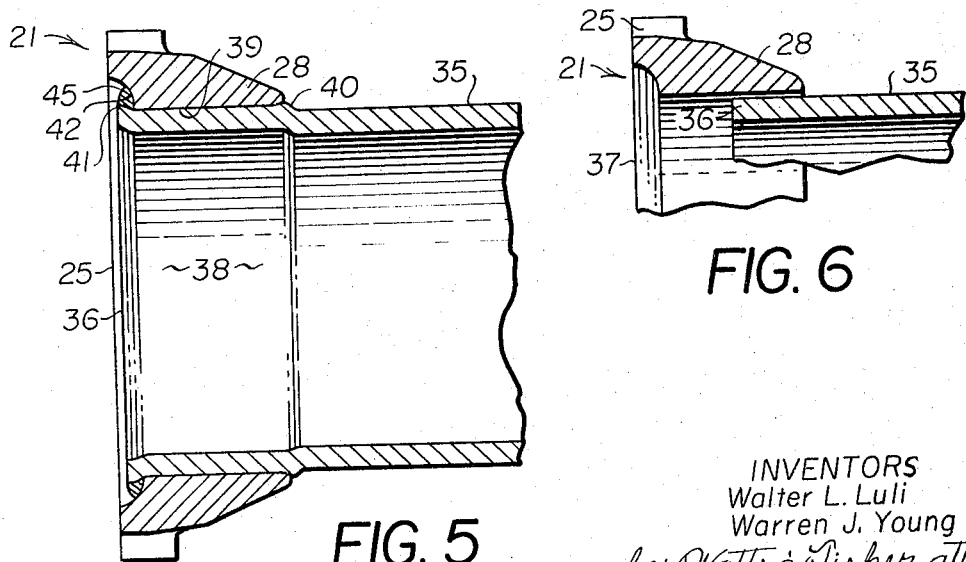
FIG. 5
FIG. 6
INVENTORS
Walter L. Luli
Warren J. Young
by Watts & Fisher, attys.

United States Patent Office 3,300,231
Patented Jan. 24, 1967

3,300,231
VEHICLE FRAME
Walter L. Luli, Kent, and Warren J. Young, Parma
Heights, Ohio, assignors to White Motor Corporation,
a corporation of Ohio
Filed Aug. 27, 1964, Ser. No. 392,557
8 Claims. (Cl. 280—106)

This invention relates to motor vehicles and more particularly to an improved rigid frame construction for highway trucks, tractors, and the like.

In the manufacture of frames for highway tractors, and similar motor vehicles, it is desirable to provide a frame structure which is rigid. In the usual prior art structure, the frame has a pair of longitudinally extending main beams which are interconnected by cross members. Conventionally, these cross members are either directly connected to the longitudinal beams or connected by suitable brackets. In either event, perimetral welds are used to fix the cross member to the main beam and these welds have, in the past been located inboard of the brackets. These perimetral welds are, when brackets are used, at the juncture of the cross member and the longitudinal beams when a cross member is welded directly to the beams.

These prior welds create stress concentrations and attendant weak areas in the cross members. This occurs because the metal immediately adjacent a weld is notched and tends to become somewhat weaker than the welded members. The portions of the cross members immediately inboard of these welds are the portions in which these high stress concentrations occur and cross member failure invariably occurs in these portions.

The present invention obviates these described disadvantages of prior structures avoiding a weld weakening of the cross members. This is accomplished through the provision of a pair of annular brackets which are connected to the longitudinally extending main frame members. These brackets are telescoped over the ends of a tubular cross member and the brackets and cross member are then locked against relative axial movement by swaging the cross member. The swaging distends portions near the ends of the cross member outwardly into tight frictional abutment with the surrounding tubular bracket. The swaging may also distend adjacent parts of the tubular members outwardly such that they overlie the ends of the bracket further preventing relative axial movement. Welds are provided at the ends of the cross member to prevent any possible relative rotation of the cross member and the brackets.

The resultant construction is a frame structure which is stronger than prior art structures and of reduced weight due to the highly efficient torsional section. The frame structure is less expensive to manufacture due to simpler manufacturing techniques and due to the fact that low cost, inexpensive materials can be employed. A truck incorporating the frame structure of this invention is, then, not only a better product from the standpoint of having a lower cost, stronger frame, but is also a better product because it is lighter weight and, therefore, can carry a higher legal paid load.

Accordingly, the objects of this invention are to provide a novel and improved vehicle frame structure and a method of making such structure.

Other objects and a fuller understanding of the invention may be had by referring to the following description and claims taken in conjunction with the accompanying drawings in which:

FIGURE 3 is a foreshortened side elevational view of the cross member and supporting brackets on a scale enlarged with respect to FIGURES 1 and 2;

FIGURE 4 is an end elevational view of the cross member and connecting brackets as seen from the plane indicated by the line 4—4 of FIGURE 3 and on an enlarged scale with respect to FIGURE 3;

FIGURE 5 is a foreshortened sectional view of an end portion of the cross member assembly as seen from the plane indicated by the line 5—5 of FIGURE 4 and on the scale of FIGURE 4; and FIGURE 6 is a partially exploded fragmentary sectional view on the scale and plane of FIGURE 5.

Figure 1:
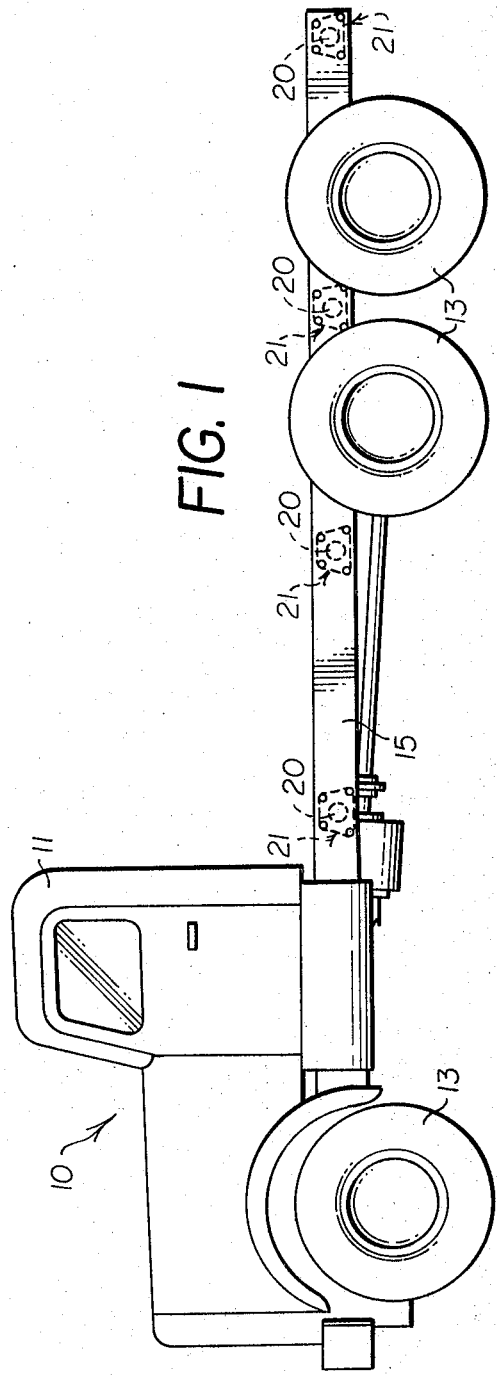
FIGURE 1 is a side elevational view of a vehicle incorporating the frame structure of this invention.

Referring now to the drawings and FIGURE 1 in particular, a highway tractor is shown generally at 10. The tractor 10 includes the usual cab 11 supported on a frame shown generally at 12. Road wheels 13 are provided to support the frame.

Figure 2:
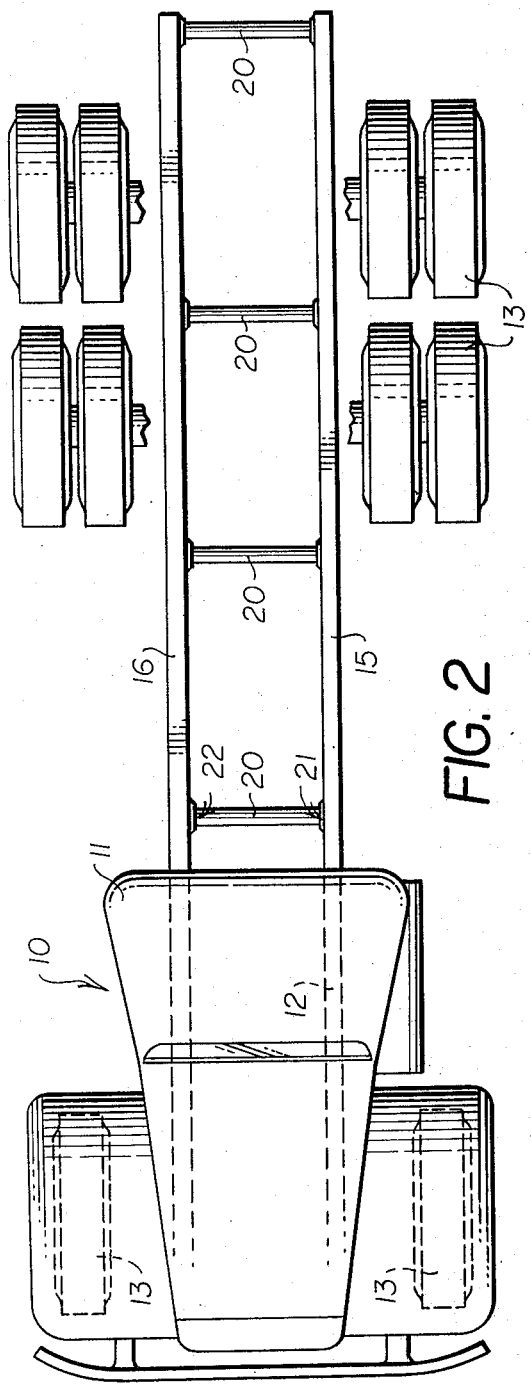
FIGURE 2 is a fragmentary top plan view of the frame.

The frame includes longitudinally extending, port and starboard, main beams 15, 16, which extend the length of the vehicle. These main beams are frame members that are connected together by suitable cross members including the novel and improved cross member assembly shown generally at 20 in FIGURES 2 and 3.

The cross member assembly 20 includes port and starboard brackets 21, 22, which are bolted respectively to the port and starboard main frame members 15, 16 as by bolts 23. The brackets 21, 22 include perimetral mounting flange portions 25, 26, respectively. The mounting flange portions 25, 26 are generally in the shape of symmetrical trapezoids, FIGURE 4. Each of these flange portions has four bolt holes 27 with each hole located at a corner of the trapezoid.

The mounting brackets 21, 22 respectively include annular cross member receiving portions 28, 29. The portions 28, 29 are connected to the flange portions by suitable upper and lower web portions 30, 31, FIGURE 4.

One of the outstanding advantages of the invention resides in the use of a tubular cross member 35 which spans the space between the longitudinal frame members 15, 16 and is rigidly connected to the brackets 21, 22. One of the less apparent advantages of this cross member 35 is that it can be made from ordinary, round, steel pipe rather than being of a specialized construction such as one of square cross section. The cross member 35 is connected to the brackets 21, 22 in a manner which will best be understood by reference to FIGURES 4–6 where the connection of the bracket 21 is shown.

An end 36 of cross member 35 is telescoped into the annular portion 28 of the bracket 21, FIGURE 6. The cross member 35 is telescoped through the annular portion 28 until the end 36 is near but slightly spaced from the plane of mounting surface 37 of the mounting flange 25.

A swaging tool is then inserted in a portion 38 of the tubular member adjacent the end 36 and within the annular portion 28. The swaging tool is then allowed to rotate around the interior of the portion 38 until it is deformed outwardly into the contour shown most plainly in FIGURE 5. This swaged portion 38 is deformed into tight, compressive abutment with inner surface 39 of the annular portion 28.

While it is not apparent from the drawing because of the relatively small scale, the thickness of the swaged portion will be somewhat less than the thickness of the remainder of the cross member. This is true because the swaged portion is compacted somewhat by the swaging and stretched and deformed outwardly until it has greater inside and outside diameters.

In the pictured embodiment, an annular port 40 of the tubular member 35 adjacent the swaged portion 38 is deformed outwardly until it overlaps the inner end of the annular portion 28, FIGURE 5. Similarly, an annular part 41 of the tubular member 35 adjacent its end 36 is deformed outwardly until it overlies a shoulder surface 42 at the outer end of the annular portion 28. The tight frictional abutment of the swaged portion 38 with the surface 39 and the tight overlapping of the annular portion 28 by the swaged parts 40, 41 provide tight interconnection which prevents relative rotation of the mounting bracket 21 and the tubular member 35, a weld 45 is provided at the inner end 36 of the tubular member, FIGURES 4 and 5. Alternately spaced tack welds may be employed. Since the welds are outboard of the swaged portions 38, the problem of creating stress concentrations inboard of the brackets is completely obviated.

In use, any forces acting on the tubular member and tending to flex it relative to the mounting bracket 28 will have their maximum concentration to the right, as viewed in FIGURE 5, of the bracket 21. Since the only welding is welding at the left hand end, again as viewed in FIGURE 5, of the tubular member 35, no areas of stress concentration are built up near where the maximum flexure occurs. The result is an extremely strong and long lived connection. By distinction, the custom with the prior art has been to provide circumferential welds in the area of the section 40 which welds create areas of stress concentration. Failure would occur immediately to the inboard of the mounting bracket 21.

In referring to FIGURES 4–6, the connection of the mounting bracket 21 to the cross member 35 has been described in detail. The connection of the mounting bracket 22 to the right hand end, as viewed in FIGURE 3 of the cross member 35, is identical.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. In a vehicle frame structure, the combination of:
(a) a pair of spaced generally parallel beams;
(b) an elongated tubular cross member extending substantially from one of said beams to the other;
(c) first and second brackets fixed to said first and second beams respectively;
(d) each of said brackets including an endless portion in telescopic relationship with an end portion of said tubular cross member and forming respectively first and second connections of said cross member to said first and second brackets;
(e) said cross member end portions being deformed circumferentially and radially toward the bracket portion of the same connection into tight frictional abutment therewith, the metal in said deformed portion being compressed and more dense than the remaining metal in the cross member;
(f) parts of said cross member at each side of each of said deformed portions overlying both ends of one bracket portion to prevent relative axial movement of the brackets and cross member in both directions; and,
(g) means securing the bracket and cross member against relative rotation without creating areas of stress concentration in said cross member inboard of said brackets.

2. The article of claim 1 wherein the means securing the bracket and cross member comprises welds outboard of the brackets and near the ends of the cross member.

3. In a vehicle frame structure including a pair of spaced generally parallel beams, a cross member assembly construction comprising:
(a) a tubular cross member extending substantially from one beam to the other;
(b) first and second brackets respectively secured to the first and second beams, said brackets each including a through cross member receiving passage and being telescoped over and secured to the cross member;
(c) said cross members each including portions deformed outwardly into tight circumferential engagement with each surrounding bracket with parts of the deformed portions extending radially outwardly of the passage and abutting the brackets such that said parts prevent movement of the brackets toward one another axially along said cross member;
(d) said deformed portions being more dense than the remainder of the cross member and substantially preventing any relative movement of the brackets and cross members without creating areas of stress concentration in the cross member inboard of the brackets; and
(e) said assembly including means outboard of said portions and near the ends of said cross member preventing axial movement of the brackets away from one another and further preventing relative rotation of the brackets and the cross member.

4. The device of claim 3 wherein said parts extending axially outwardly of said passage respectively abut the outboard end of the first and second brackets.

5. The device of claim 3 wherein said means outboard of the brackets comprises at least one weld between each cross member and bracket near an end of the cross member.

6. The device of claim 5 wherein said means outboard of the brackets comprises first and second end parts of said cross members formed radially outwardly of said passage and abutting the first and second brackets respectively and preventing movement of the brackets longitudinally of the cross members away from one another.

7. The device of claim 6 wherein said means outboard of said brackets also comprises at least one weld between each cross member and bracket near an end of the cross member.

8. In a vehicle frame structure including a pair of spaced generally parallel beams, a cross member assembly construction comprising:
(a) a tubular cross member extending substantially from one beam to the other;
(b) first and second brackets respectively secured to the first and second beams and telescoped over and secured to the cross member;
(c) said cross members including portions deformed outwardly into tight circumferential engagement with each surrounding bracket, said deformed portions each having inside and outside diameters respectively larger than the inside and outside diameters of non-deformed portions of the cross member immediately inboard of the respective brackets, the contact of said deformed portions with said brackets being such as to prevent movement of the brackets toward one another and away from one another axially along said cross member;

(d) said deformed portions being more dense than the remainder of the cross member and substantially preventing any relative movement of the brackets and cross members; and (e) said assembly including means outboard of said portions and near the ends of said cross member preventing axial movement of the brackets away from one another and further preventing relative rotation of the brackets and the cross member.

References Cited by the Examiner

UNITED STATES PATENTS

| 1,666,278 | 4/1928 | Woodhead | 280—106 |
| 1,704,843 | 3/1929 | Smith | 280—106 |

FOREIGN PATENTS 384,935  12/1932  Great Britain.

BENJAMIN HERSH, *Primary Examiner.*

P. GOODMAN, *Assistant Examiner.*